(12) United States Patent
Raa et al.

(10) Patent No.: US 7,358,332 B2
(45) Date of Patent: *Apr. 15, 2008

(54) BIOACTIVE PEPTIDES, USES THEREOF AND PROCESS FOR THE PRODUCTION OF SAME

(75) Inventors: Jan Raa, Oslo (NO); Gunnar Rorstad, Tromso (NO)

(73) Assignee: Seagarden AS, Haugesund (NO)

( * ) Notice: Subject to any disclaimer, the term of this patent is extended or adjusted under 35 U.S.C. 154(b) by 0 days.

This patent is subject to a terminal disclaimer.

(21) Appl. No.: 10/848,665

(22) Filed: May 19, 2004

(65) Prior Publication Data

US 2004/0214262 A1 Oct. 28, 2004

Related U.S. Application Data

(62) Division of application No. 09/854,968, filed on May 14, 2001, now Pat. No. 6,747,001, which is a division of application No. 09/061,575, filed on Apr. 16, 1998, now Pat. No. 6,376,650.

(51) Int. Cl.
*C07K 1/00* (2006.01)
*A61K 38/46* (2006.01)
*A23L 1/28* (2006.01)

(52) U.S. Cl. ............ 530/343; 530/344; 530/857; 426/63; 426/641; 426/656; 426/657; 424/94.66; 424/439; 424/442; 424/520; 514/2; 514/21

(58) Field of Classification Search ........ 530/343, 530/344, 857; 426/63, 641, 656, 657; 424/94.66, 424/439, 442, 520; 514/2, 21

See application file for complete search history.

(56) References Cited

U.S. PATENT DOCUMENTS

| 4,016,147 | A | 4/1977 | Fujimaki et al. |
| 5,049,397 | A | 9/1991 | Kolbeck et al. |
| 5,676,986 | A | 10/1997 | Choudhury |
| 5,906,941 | A | 5/1999 | Shetty |
| 6,747,001 | B2 * | 6/2004 | Raa et al. .............. 514/2 |

FOREIGN PATENT DOCUMENTS

| CL | 27390 | | 5/1973 |
| EP | 0 589 105 A1 | | 3/1994 |
| GB | 2214810 | | 9/1989 |
| JP | 3118329 | | 5/1991 |
| JP | 03118329 A | * | 5/1991 |
| WO | WO81/03262 | * | 1/1981 |
| WO | WO 81/03262 A1 | | 11/1981 |
| WO | WO 90/14016 A1 | | 11/1990 |
| WO | WO 95/04467 A1 | | 2/1995 |
| WO | WO 95/21540 A1 | | 8/1995 |

OTHER PUBLICATIONS

Brewer et al., Can. Int. Food Sci. Technol., vol. 17, No. 1, pp. 38-43, 1984*
"Pepsin", *The Columbia Electronic Encyclopaedia*, Columbia University Press, 1994.
Solveig, Karlsen et al., "Structure and proposed amino acid sequence of a pepsin from Atlantic cod," *Acta Crystallographica Section D Biological Crystallography*, Jan. 1, 1998, pp. 32-46, vol. 54, No. 1 (BIOSIS abstract).
Tarky, W., et al., "Protein hydrolysate from fish waste," *J. of Food Science*, 1973, pp. 917-918, vol. 38, No. 6 (FSTA abstract).
Brewer, et al., "Atlantic Cod Pepsin-Characterization and Use as a Rennet Substitute," *Com. Int. Food Sci. Technol.*, 1984, pp. 38-43, vol. 17, No. 1.
Gildberg et al., *Chemical Abstract*, p. 9551, vol. 125, No. 11, Ref. No. 139962 (Corp. Biochem., Physiol. b., Biochem Mol. Biol. 1996, 114BC1(1), 97-101.
Gildberg et al., "Isolation of Acid Peptide Fractions From a Fish-Protein Hydrolysate with Strong Stimulatory Effect on Atlantic Salmon (Salmo-Salar) Head Kidney Leukocytes," *Comp. Biochem. Physiol.*1996, pp. 97-101, vol. 114B, No. 1.
Yamashita et al., *Journal of Food Science*, 1976, pp. 1029-1032, vol. 41, No. 5.

* cited by examiner

*Primary Examiner*—Jon Weber
*Assistant Examiner*—Abdel A Mohamed
(74) *Attorney, Agent, or Firm*—Rothwell, Figg, Ernst & Manbeck

(57) ABSTRACT

Novel bioactive peptide compositions and process for producing the same and the use of such compositions for enhancing the growth of warm blooded animals and fish is disclosed.

17 Claims, No Drawings

BIOACTIVE PEPTIDES, USES THEREOF AND PROCESS FOR THE PRODUCTION OF SAME

This application is a divisional of U.S. Ser. No. 09/854,968, filed May 14, 2001, now U.S. Pat. No. 6,747,001, which is a divisional application of U.S. Ser. No. 09/061,575, filed Apr. 16, 1998, now U.S. Pat. No. 6,376,650, which application is hereby incorporated herein by reference.

FIELD OF THE INVENTION

This invention relates to hovel bioactive peptide compositions which enhance the growth of animals, a process for the preparation of same and the use of such compositions for enhancing the growth of warmblooded animals and fish.

BACKGROUND OF THE INVENTION

It is well known that porcine and bovine plasma protein can be used in feed formulations for warm blooded animals to improve health, growth and general performance. However; the need for a replacement for such plasma protein is of great importance. The cost of plasma protein continues to increase as foreign and domestic demand increases. In addition, inadequate supply of plasma protein is a frequent problem. Also, due to concern of contamination of host animals through the feeding of plasma protein there is becoming a further need for a non-plasma product which can be utilized in those formulations where plasma protein is either not available or its use barred.

In addition, it is well known that protein hydrolyzates prepared by reaction of selected protein materials with at least one proteolytic enzyme can also be used in feed formulations. Such compounds are generally in such amounts as to maximize its content in the feed formulation without having a negative effect on the host. Such hydrolyzates provided a replacement for fish meal as a protein source and thus while providing nutritional values provided no other benefit in the growth of the host.

Thus there is presently experienced a need for a suitable replacement for plasma as an ingredient of feed formulations as well as the need to achieve growth enhancement for host animals.

SUMMARY OF THE INVENTION

The aforementioned need is met by the present invention by providing a bioactive peptide composition which not only provides an alternative to plasma products but also serves to enhance the growth of both animals and fish.

According to the present invention a bioactive peptide composition is produced by the enzymatic hydrolysis of a protein using the proteolytic enzyme derived from cod, specifically the stomachs of Atlantic cod.

The present invention is based upon the discovery that the peptide product obtained through enzymatic hydrolysis of a protein source with the pepsin enzyme derived from the stomach of Atlantic cod can be used as a substitute for plasma protein in achieving growth enhancement of warm blooded animals.

In a first aspect of the present invention there is provided novel animal feed compositions which enhance growth.

In addition, the present invention is also based on the further discovery that such peptide products can be used at low levels to enhance the growth of fish.

Accordingly, in one aspect of the present invention there is provided a novel peptide product which is useful for enhancing the growth of warm blooded animals and fish.

In another aspect of this invention there is provided a process for the production of growth enhancing peptides from a protein source.

In another aspect of this invention there is provided a novel process for enhancing the growth of warm blooded animals and fish.

Other aspects, objects and the several advantages of this invention will be apparent from the foregoing disclosure and appended claims.

The term bioactive peptide compositions as used herein is intended to define a composition consisting essentially of a mixture of peptides with aromatic amino acids in N-terminal position, produced by hydrolysis of a protein source at a pH of 2–6 with pepsins from fish as the hydrolytic enzyme.

The bioactive peptide product of this invention is prepared by a process comprising the steps of:

(a) hydrolyzing a selected protein material., dispersed in an aqueous medium, together with cod pepsin at a controlled temperature and acidic pH;

(b) removing lipids and solids from the pepsin treated acidized protein source; and thereafter (c) recovering the resulting bioactive peptide.

The process may employ protein material from any of a great variety of sources including meats, fish and plants. Protein material from fish is particularly preferred for use in the process of this invention.

The process of this invention is particularly adapted to effecting protein hydrolysis in an acidic medium of controlled pH to produce a bioactive peptide composition suitable for use in the enhancement of growth of host animals. Protein material is prepared for treatment by grinding, comminution, or other means to provide a suitable particle size for slurring with acid. The aqueous slurry is heated with agitation at a combination of temperature and time such that the initial reaction velocity of hydrolysis is maximized.

The enzyme employed in the process of this invention is the proteolytic pepsin enzyme derived from the stomach of Atlantic cod. In one presently preferred embodiment of this invention the enzyme is obtained by a process which comprises homogenizing the cod stomach in the presence of enough formic acid to lower the pH to 4 and then heating for a period of time whereby the homogenate becomes a liquid slurry due to the digestion of the tissues by the enzymes present in the stomach and thereafter recovering from the aqueous phase following removal of sludge and oils following concentration and drying the desired pepsin enzyme.

In carrying out the process, the homogenate of the Atlantic cod stomach can also be employed as the enzyme source. Thus following the homogenizing of the cod stomach in the presence of acid and the digestion of the tissues thereof by the enzymes present therein, the resulting liquid slurry which is enzyme rich can be employed directly into the process of the present invention as the enzyme source for the production of bioactive peptides.

In the production of the bioactive peptide composition of the invention, a suitable protein source is treated at a pH in the range of about 2–6, preferably at a pH of 4, with the pepsin enzyme derived from the Atlantic cod stomachs for a time to effect hydrolysis of the protein source so as to form a mixture of peptides having aromatic amino acids in N-terminal positions which following heating and thereafter removal of oils and sludge provided a liquid composition consisting essentially of bioactive peptides and deactivated cod pepsin.

The hydrolysis step is conducted in a continuous stirred-tank reactor employing an enzyme to protein substrate ratio selected to obtain the desired level of conversion within a time period of 24 to 100 hours.

Generally the enzyme is added in amounts in the range of 0.5 to 5 g per 1000 kg of protein.

Acid employed in the hydrolysis process in an amount to provide normally 3% volume by volume.

Following the removal of oils and undissolved solids from the partially hydrolyzed aqueous protein material dispersion, the recovered protein hydrolyzate fraction may be concentrated, as by reverse osmosis or thermal evaporation and dried, as by freeze drying or spray drying, and sent to product storage for subsequent packaging and distribution.

Pepsin enzyme suitable for use in one embodiment of the present invention is obtained by hydrolysis of Atlantic cod fish stomachs at a pH in the range of 2–6. Following hydrolysis, the resulting hydrolyzate is subjected to lipid and solids removal followed by ultrafiltration of the resulting liquid peptide pepsin mixture to effect recovery of the pepsin enzyme therefrom.

The Atlantic cod pepsin which is used in the process of this invention is a proteolytic enzyme prepared from Atlantic cod (*Gadus morhua*) stomach by autolysis. The enzyme has a specific activity of 100–200 Anson Units expressed as μmol TCA-soluble tyrosine released from haemoglobin per hour at pH 3 and 25° C.

The compositions produced by the process of this invention have been found to possess significantly distinctive properties. Such compositions are bioactive peptides which are capable of enhancing growth when included in feed compositions for host animals.

Accordingly, the bioactive peptides of this invention are most appropriate for providing a process for the enhancement of growth of an animal by feeding such animal with an amount of such bioactive peptide to effect growth enhancement of the host animal. In general such growth enhancement is achieved when the bioactive peptide is introduced into the host animal in an amount in the range of 0.1 to 5 g/kg body weight per day.

Feed formulations using the active peptide compositions of this invention will be added to conventional feed ingredients for the intended host animal an amount of bioactive peptide which is sufficient to achieve growth enhancement activity.

Generally such amounts will be in the range of from about 0.1 to about 5 weight percent of the total feed, preferably from about 1 to 2%.

Enzyme hydrolysis of the protein source is normally carried out at a temperature in the range of about 10° C. to about 45° C. and at a pH in the range of about 2 to about 6. Suitable pH is achieved by use of either a mineral or organic acid or salts thereof which is added prior to addition of the pepsin. The amount of acid employed is that which will provide the desired pH level.

In one presently preferred embodiment of the invention there is employed a lower carboxylic acid namely formic acid.

Protein source starting materials suitable for the process of the present invention are:
1. fish wastes including whole trash fish, fish left after filleting, fish solubles, fish viscera and any other materials which are by-products of the fishing industry and processing
2. pork skins and tissues
3. beef tissue
4. soy bean proteins or other seed proteins
5. milk proteins The following examples will further illustrate the process and products of the invention.

EXAMPLE I

Enzyme Preparation

Fish stomachs of Atlantic cod, collected from processing plants, are homogenized in the presence of enough formic acid to lower the pH of the homogenate to 4. The homogenate is then heated to 27° C. and held at this temperature for 48 hours. During this period the homogenate becomes a liquid slurry due to digestion of the tissues by the enzymes present in the stomachs. The liquid slurry is then stored in a tank wherein a sludge gradually deposits at the bottom and oil floats to the surface. The aqueous phase between the sludge and the oil layer is then concentrated by ultrafiltration (cut off 10,000 mw) and sprayed dried at a temperature below the inactivation temperature for the pepsin enzyme (65° C.). The resulting dried and yellow powder contains 100–200. Anson units of protease activity as measured by standard assays for pepsin activity e.g. μmol tyrosine released from haemoglobin per hour at pH 3 and 25° C.

EXAMPLE II

Production of Liquid Bioactive Peptides

1000 Kg of by-product from fish processing, e.g. residual meat on back bones, skins, guts, heads, were homogenized in an industrial meat grinder and 30 liters of 85% formic acid added when the homogenate was pumped into a storage tank with stirring equipment.

To the resulting acidized homogenate was added 1 kg of cod stomach enzymes which was obtained in accordance with the protocol of Example I. The resulting mixture was then maintained at 30° C. for a period of about 5 days to achieve enzymatic degradation of the acidized by products.

Thereafter, the resulting digest was heated to a temperature of 80° C. to inactivate the added enzyme and to permit oil which was present in the raw materials to float to the surface for removal. After removal of oil by centrifugation in an industrial centrifuge and removal of undissolved bones by screening there was obtained 850–950 liters of an aqueous slurry which was then concentrated by evaporation to 40% dry weight and a final volume of 250–350 liters.

The resulting concentrated product containing 20% by weight of non digested protein and 70 weight percent of peptide and 10% minerals is designated liquid crude peptide product or <<LCP>>.

EXAMPLE III

Production of Dried Bioactive Peptide 100 liters of the liquid crude peptide product of Example II was dried by spray drying in a NIRO spray dryer at an air out temperature of 80° C, to provide 40 kg of dried crude peptide product <<DCP>> containing undigested protein, peptides and amino acids.

EXAMPLE IV

Production of Refined Peptides <<RBP>>

400 liters of LCP produced as described in Example II was subjected to conventional particle filtration using a bag filtration unit, to provide about 250 liters of a solution free of particles bigger than 40μ. Thereafter the resulting filtrate was subjected to ultrafiltration in an industrial hollow fiber cartridge (Amicon) filtration unit with a cut off of 10,000 MW to provide 200 liters of a permeate containing peptides with MW lower than 10,000. The resulting Refined Bioactive Peptide <<RBP>> can be used in the liquid form. However, 200 liters of RBP was dried by spray drying in a Niro dryer at 85° C. (air out) to provide 80 kg of RBP in dry form.

EXAMPLE V

Preparation of Feed Compositions

Using dried refined peptide product as produced in Example IV, a series of test feed compositions were prepared using a standard diet formulation having the peptide content as noted in the following table. For performance evaluation a further series of feed compositions was prepared in the same manner with porcine plasma protein.

| Composition No. | 1 | 2 | 3 | 4 | 5 | 6 | 7 |
|---|---|---|---|---|---|---|---|
| Feeding Period 0–13 days | | | | | | | |
| Plasma protein % | 0 | 4 | 3 | 2 | 1 | 0 | 0 |
| Refined Peptide % | 0 | 0 | 1 | 2 | 3 | 4 | 2 |
| Feeding Period 13–33 days | | | | | | | |
| Plasma protein % | 0 | 0 | 0 | 0 | 0 | 0 | 0 |
| Refined Peptide % | 0 | 0 | 0 | 0 | 0 | 2 | 1 |

EXAMPLE VI

The Effect of RBP and Porcine Plasma Protein

To determine the effect of peptide (RBP) and porcine plasma on growth performance of starter pigs a series of treatments using the formulations of Example V were carried out with 7 pens of 22 individual starter pigs.

The results of the feeding treatments are shown in the following table:

| Treatment composition | 1 | 2 | 3 | 4 | 5 | 6 | 7 |
|---|---|---|---|---|---|---|---|
| Weight (kg) | | | | | | | |
| Initial | 5.91 | 5.90 | 5.91 | 5.91 | 5.91 | 5.91 | 5.91 |
| Day 13 | 7.58 | 8.18 | 8.53 | 8.29 | 9.17 | 8.94 | 8.23 |
| Day 33 | 16.24 | 16.24 | 17.04 | 16.85 | 17.94 | 16.49 | 17.8 |
| Weight Gain (kg) | | | | | | | |
| 0–13 days | 1.67 | 2.28 | 2.62 | 2.37 | 3.26 | 3.03 | 2.32 |
| 0–33 days | 10.33 | 10.34 | 11.13 | 10.94 | 12.03 | 10.58 | 11.89 |
| Weight Gain (%) | | | | | | | |
| 0–13 days | 23 | 38 | 44 | 40 | 55 | 51 | 39 |
| 0–33 days | 175 | 175 | 188 | 185 | 204 | 179 | 201 |
| Protein consumed/ | | | | | | | |
| weight gain | 0.32 | 0.27 | 0.27 | 0.29 | 0.26 | 0.26 | 0.27 |

The above results show that use of the bioactive peptide of the present invention has a marked effect on growth of young pigs and that this product can replace plasma proteins in starter diets. At a level of 2% in the starter diets the bioactive peptide (RBP) causes the same enhancement of growth as 4% porcine plasma protein during the first 13 days after weaning.

Unlike plasma protein, the bioactive peptide of the present invention results in enhanced growth throughout the entire growth period from weaning of the pigs and the following 33 days.

EXAMPLE VII

Preparation of Fish Feed Compositions

A composition for use as a feed for salmon was prepared by admixing the following ingredients:

| Ingredient | % of dry weight |
|---|---|
| Fish Meal (low temperature dried) | 44 |
| Fish meal (normal quality) | 19 |
| Fish oil | 20 |
| Wheat meal | 14 |
| Potato starch | 2 |
| Vitamin C | 0.1 |
| Premix (minerals and vitamins) | 1.0 |
| Carrophyll pink (astaxanthin) | 0.1 |

| Chemical composition | |
|---|---|
| Dry matter | 96% |
| Protein | 52% |
| Lipid | 21% |
| Minerals | 10% |

For demonstration of the effectiveness of bioactive peptide in the salmon feed, a composition was prepared wherein 5% of the fish meal was replaced by 5% of dried bioactive crude peptide (DCP).

EXAMPLE VIII

Effect of DCP on Salmon Growth

Salmon (*Salmo salar*) at an average individual weight of 600 grams were separated in two net cages in the sea with 100 fish in each cage. One group was fed the standard salmon feed of Example VII and the other group the same feed containing 5% DCP.

After feeding for 6 months the salmon fed the standard salmon feed had an average weight of 2.280 kg whereas the salmon fed the 5% DCP diet had an average weight of 2.630 kg. The growth in the reference group during this feeding period was in other words from an average individual weight of 600 grams to 2,280 g, or 1,680 grams whereas the DCP containing group grew from 600 grams to 2,630 grams, or 2,030 grams.

Comparison of the growth of the two groups indicates that using the product of the present invention there was achieved a 12% growth over those fishes that did not receive the bioactive peptide (DCP).

We claim:

1. A feed composition for animals which will enhance the growth thereof, said composition containing therein a bioactive peptide composition consisting essentially of a mixture of peptides having an aromatic amino acid in the N-terminal position and having molecular weights lower than 10,000 Da, produced by enzymatic hydrolysis of a protein source with pepsin from fish as the hydrolytic enzyme.

2. The feed composition of claim 1 wherein said bioactive peptide composition is present in an amount in the range of from 0.1 to 5 weight percent.

3. The feed composition of claim 1 wherein said animal is a fish.

4. The feed composition of claim 1, wherein the protein source comprises fish or fish waste.

5. The feed composition of claim 1, wherein the protein source comprises pork skin and tissues or beef tissues.

6. The feed composition of claim 1, wherein the protein source comprises soy proteins or other seed proteins.

7. The feed composition of claim 1, wherein the protein source is milk proteins.

8. The feed composition of claim 1, wherein the protein source is hydrolyzed with pepsin from fish at a pH in the range of 2–6.

9. The feed composition of claim 1, wherein said pepsin is from Atlantic cod.

10. The feed composition of claim 1, wherein said bioactive peptide compositions is present in a growth promoting amount.

11. The feed composition of claim 1, wherein said animals are one of the group consisting of warm blooded animals or fish.

12. The feed composition of claim 11, wherein said warm-blooded animal is a pig.

13. A process for the enhancement of growth of an animal which comprises feeding said animal with an amount of the composition of claim 1 sufficient to effect growth.

14. The process in accordance with claim 13 wherein the animal is fed from 0.1 to 5 grams of bioactive peptide per kg of body weight.

15. The process of claim 13 wherein said animal is at least one of the group consisting of warm blooded animals and fish.

16. The process of claim 15 wherein said animal is a pig.

17. The process of claim 15 wherein said animal is a fish.

* * * * *